United States Patent [19]

Kurita et al.

[11] 4,108,777

[45] Aug. 22, 1978

[54] FILTER PRESS

[75] Inventors: Tetsuya Kurita, Takarazuka; Seiichi Suwa, Yao; Masayuki Nakamura, Osaka; Takashi Torii, Izumi, all of Japan

[73] Assignee: Kurita Machinery Manufacturing Co., Ltd., Osaka, Japan

[21] Appl. No.: 831,675

[22] Filed: Sep. 8, 1977

[30] Foreign Application Priority Data

Oct. 29, 1976 [JP] Japan .................. 51-130671
Jun. 25, 1977 [JP] Japan .................. 52-75671
Aug. 1, 1977 [JP] Japan .................. 52-92854
Aug. 1, 1977 [JP] Japan .................. 52-92855

[51] Int. Cl.² .......................................... B01D 25/38
[52] U.S. Cl. .................................. 210/225; 210/231
[58] Field of Search ........................... 210/224-231

[56] References Cited

U.S. PATENT DOCUMENTS

| | | | |
|---|---|---|---|
| 3,647,082 | 3/1972 | Ishigaki | 210/225 |
| 3,690,462 | 9/1972 | Kurita | 210/225 |
| 3,698,557 | 10/1972 | Ishigaki | 210/225 |
| 3,767,052 | 10/1973 | Shibasaki | 210/225 |
| 3,807,567 | 4/1974 | Iwatani | 210/225 |
| 3,968,039 | 7/1976 | Inujima et al. | 210/225 |

Primary Examiner—Charles N. Hart
Assistant Examiner—Robert H. Spitzer
Attorney, Agent, or Firm—Wenderoth, Lind & Ponack

[57] ABSTRACT

A filter press having a plurality of filter plates so supported between fixed and movable heads of the machine framework that the filter plates can selectively be separated from each other and compressed together to a substantially watertight closure between the fixed and movable heads. A filter medium is provided for each filter plate and is composed of a pair of filter webs covering respectively the opposed filtering surfaces of the filter plate. The filter webs are connected at their one end to a winding device and at their other end to a tensioning and winding roll assembly after having turned around a pair of juxtaposed guide rolls. Each tensioning and winding roll assembly is composed of a cylindrical roll and a biasing element for biasing the cylindrical roll in one direction with the filter webs forced to be wound therearound.

6 Claims, 20 Drawing Figures

FILTER PRESS

The present invention rela tes to a filter press of a type capable of separating a liquid medium, such as a slurry, to be filtered into solid substances and filtrate by filtration or squeeze-filtration.

The filter press to which the present invention pertains is one of the most widely used pressure filters. However, as compared with a continuous pressure filter of which application is limited due to the inherent difficulty of cake discharge and the disadvantage of inaccessibility, the filter press of the type to which the present invention pertains is generally considered costly to operate because of a batch or intermittent operation. In particular, with the batch pressure filter, a frequent washing of filter mediums to remove solid substances clogging interstices of any one of the filter mediums has heretofore been required and, therefore, attempts have heretofore been made to design a batch pressure filter which requires neither a lot of time in washing the filter mediums nor temporal removal of the filter mediums for the purpose of washing of the filter mediums.

The U.S. Pat. No. 3,807,567, patented on Apr. 30, 1974, discloses such an improved version of filter press which comprises a plurality of recessed filter plates supported in face-to-face relation between fixed and movable heads, the movable head being so supported by a part of the machine frame for movement between projected and retracted positions that, when said movable head is moved from the retracted position towards the projected position, the filter plates are compressed together to a substantially watertight closure between the fixed and movable heads and, when the movable head is moved from the projected position towards the retracted position, the compressed filter plates are separated from each other. For each filter plate, a pair of filter elements are employed, each filter element comprising a filter cloth covering one of the opposed cloth supporting beads or surfaces of the plate, and upper and lower cloth supporting bars respectively secured to the upper and lower edges of the filter cloth while a portion of the filter cloth intermediate of the length of the filter cloth is turned around a guide roll positioned below the filter plate. The upper cloth supporting bar, to which the upper edge of the adjacent filter cloths of one pair of the filter elements are connected, are operatively coupled to the lower cloth supporting bar, to which the lower edges of the filter cloths of the filter elements of the adjacent two pairs are connected, by means of a pair of chains extending around associated sprocket wheels rigidly mounted on a common drive shaft.

The prior art filter press of the construction described above is so designed that, when the sprocket wheels are simultaneously rotated in one direction by a drive mechanism, the upper cloth supporting bars are brought to a position above the cloth supporting beds of the filter plates with the filter clothes covering the cloth supporting beds of the associated filter plates and, when the sprocket wheels are rotated in the opposite direction subsequently by the drive mechanism, the upper cloth supporting bars, which have been brought to the position above the cloth supporting beds of the filter plates, are lowered while the lower cloth supporting bars are upwardly shifted without slackening the filter clothes. During passage of each of the filter clothes around the guide roll positioned below the associated filter plate, the filter cloth under tension is so curved or deflected that solid substances left unfiltered between each adjacent pair of the filter clothes and forming a cake can be forced to fall by gravity leaving from the associated filter clothes of each adjacent pair.

The use of scrapers slidingly engaged to each of the filter clothes to remove the residue of the cake sticking to the surface of the filter clothes and a washing device for spraying fresh washing water to the filter clothes are also disclosed in the above numbered U.S. Pat.

However, it has been found that a filter cloth drive mechanism employed in the prior art filter press of the construction described above for training the filter elements including the upper and lower cloth supporting bars and the filter clothes is complicated. Moreover, the following disadvantages so far as the cake discharge is involved have also been found:

(1) Repeated reciprocal passage of the filter clothes around the associated guide rolls does not give a sufficient tension to the filter clothes which is required to create a "surface avalanche" or a relative slide between the cake and the filter clothes to allow the cake to separate therefrom.

(2) Since the filter elements are designed to be simultaneously trained, the individual filter clothes tend to have a different tension, when stretched, depending upon the amount of a cake built up between each adjacent two of the filter clothes and, therefore, a substantially complete removal of the cake can hardly be achieved.

(3) The difference in tension among the filter clothes tends to adversely affect the washing result of the filter clothes. If the filter clothes are insufficiently washed, there is the possibility that solid substances left unremoved would be forced to penetrate through the filter clothes into filtrate during the filtering operation effected subsequent to the washing of the filter clothes.

Accordingly, the present invention has been made with a view to substantially eliminating the above described disadvantages and inconveniences inherent in the prior art filter press and is intended to provide a further improved version wherein a tensioning and winding roll assembly is employed for each filter plate for imparting a tension to an associated filter cloth during the filtering operation and also for winding the filter cloth during the cake discharge.

These and other objects and features of the present invention will become apparent to those skilled in the art from the following description taken in conjunction with preferred embodiments thereof with reference to the accompanying drawings, in which.

Before the description of the present invention proceeds, it is to be noted that like parts are designated by like reference numerals throughout the accompanying drawings.

Figure 1:
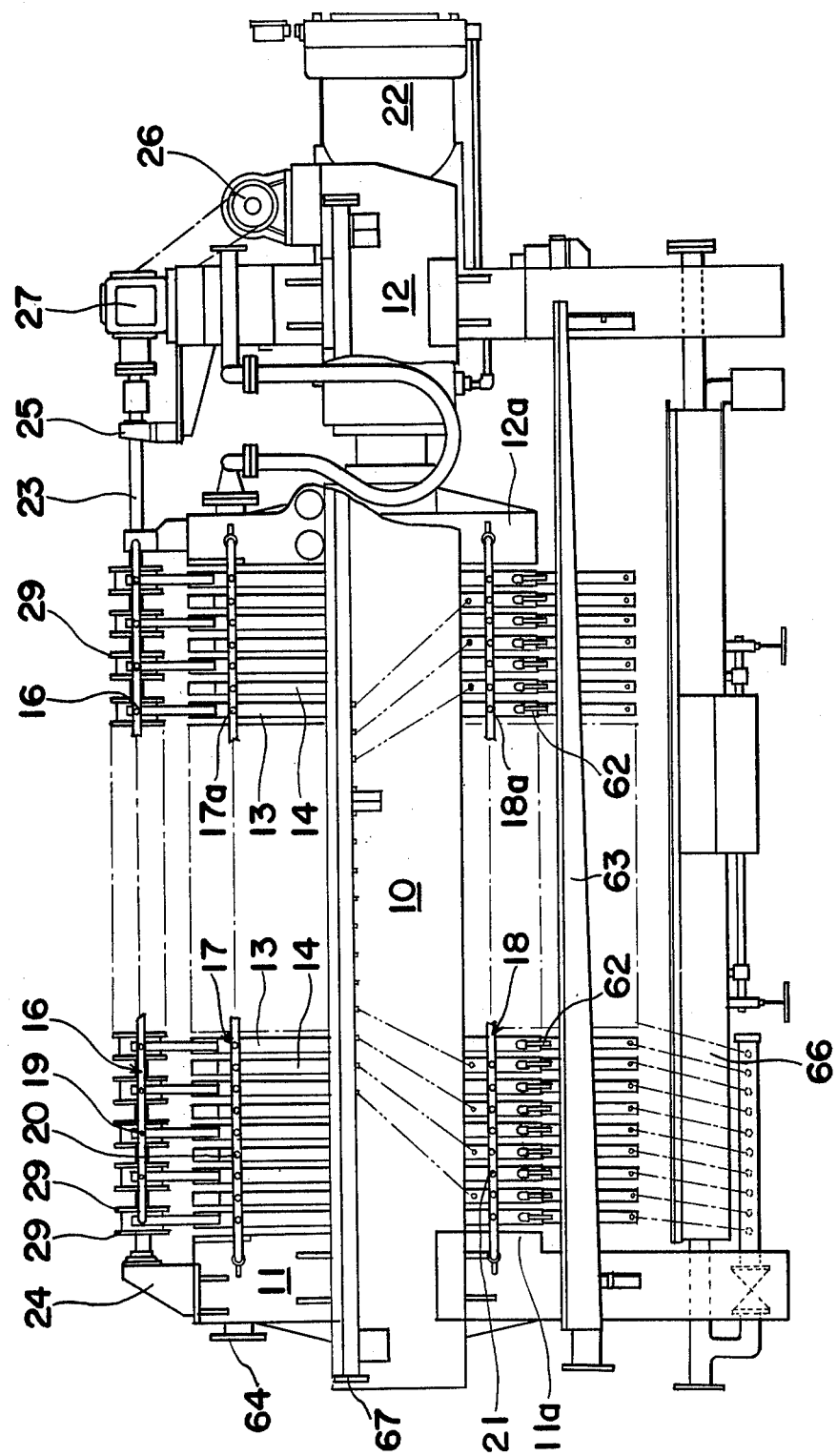
FIG. 1 is a side elevational view of the filter press according to one preferred embodiment of the present invention.
Figure 2:
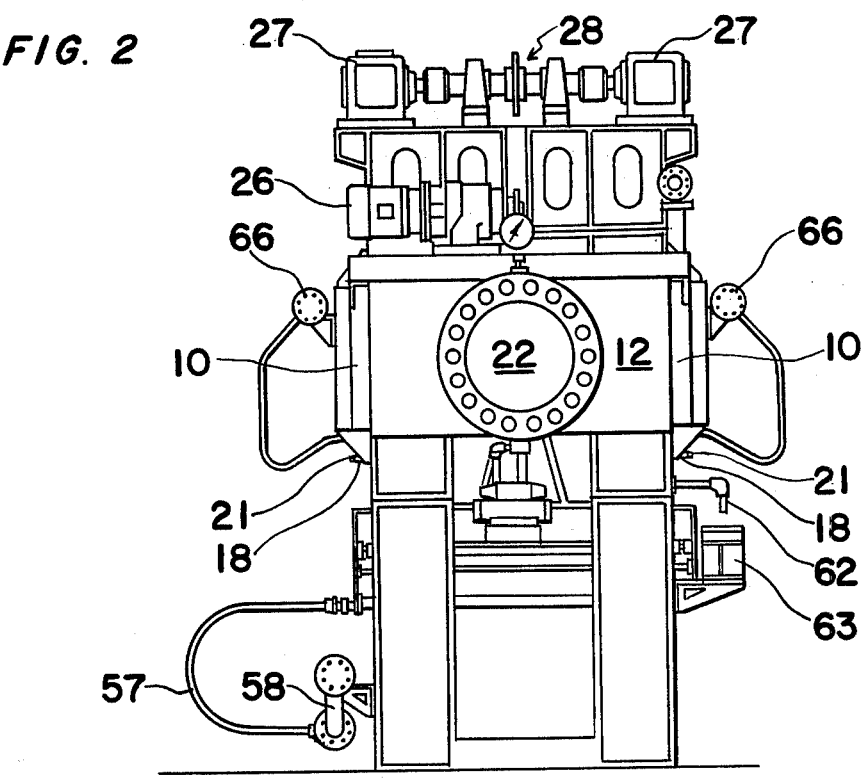
FIG. 2 is a rear end view of the filter press shown in FIG. 1.
Figure 3:
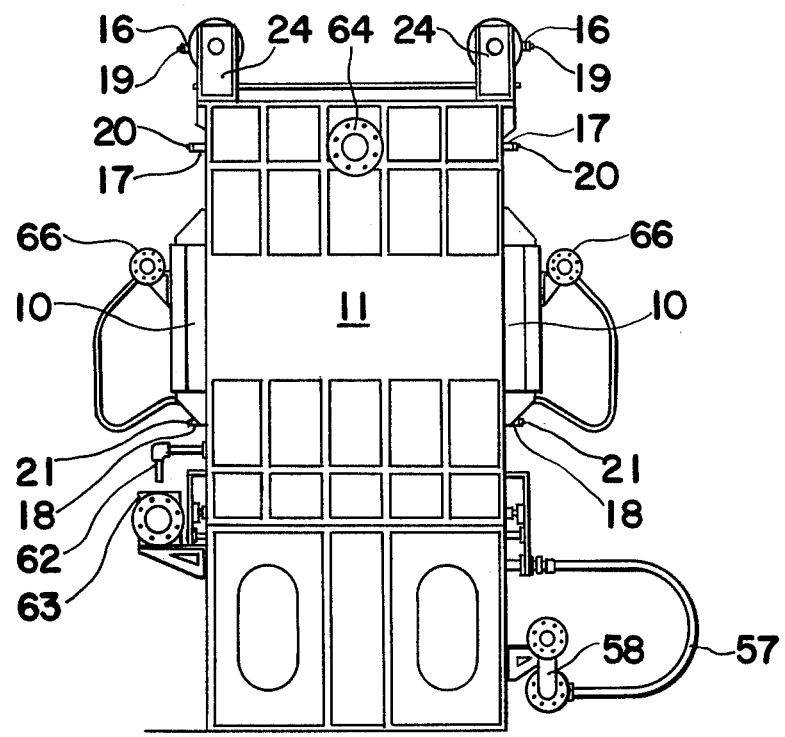
FIG. 3 is a front end view of the filter press shown in FIG. 1.
Figure 5:
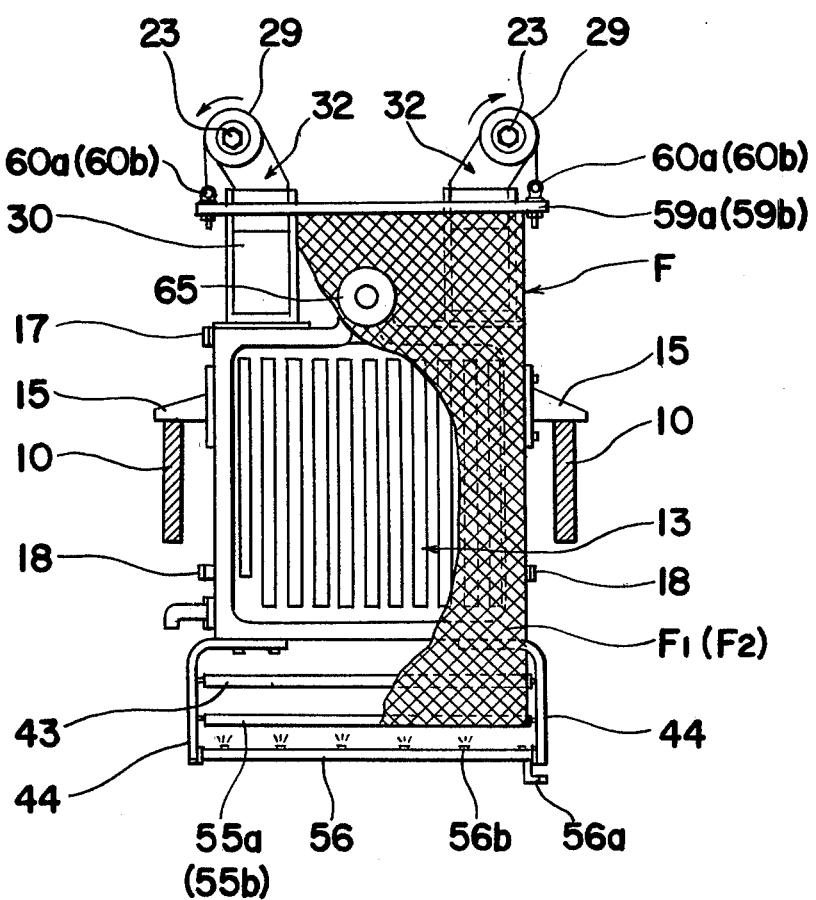
FIG. 5 is a cross sectional view, with a portion of a filter medium broken away, taken along the line V-V in FIG. 4.

Referring first to FIGS. 1 to 3, there is illustrated a filter press according to a first preferred embodiment of the present invention, which includes a pair of guide rails 10 having their front and rear ends rigidly secured to front and rear machine frames 11 and 12, respectively, and extending in parallel and spaced relation to each other between the front and rear machine frames 11 and 12. A plurality of filter plates 13 and squeeze-filter plates 14, the number of said squeeze-filter plates 14 being less than the number of the filter plates 13 by one, are alternately arranged between a fixed head 11a, which is secured to and carried by the front machine frame 11, and a movable head 12a supported by the rear machine frame 12 for movement between retracted and projected positions in a direction parallel to the longitudinal axis of any one of the guide rails 10. The filter plates 13 and the squeeze-filter plates 14 are, while they are alternately positioned between the fixed and movable heads 11a and 12a, slidingly mounted on the guide rails 10 by means of pairs of wings 15, each pair of said wings 15 extending outwardly in the opposite directions from the opposed sides of any one of the plates 13 and 14 as best shown in FIG. 5.

Figure 4:
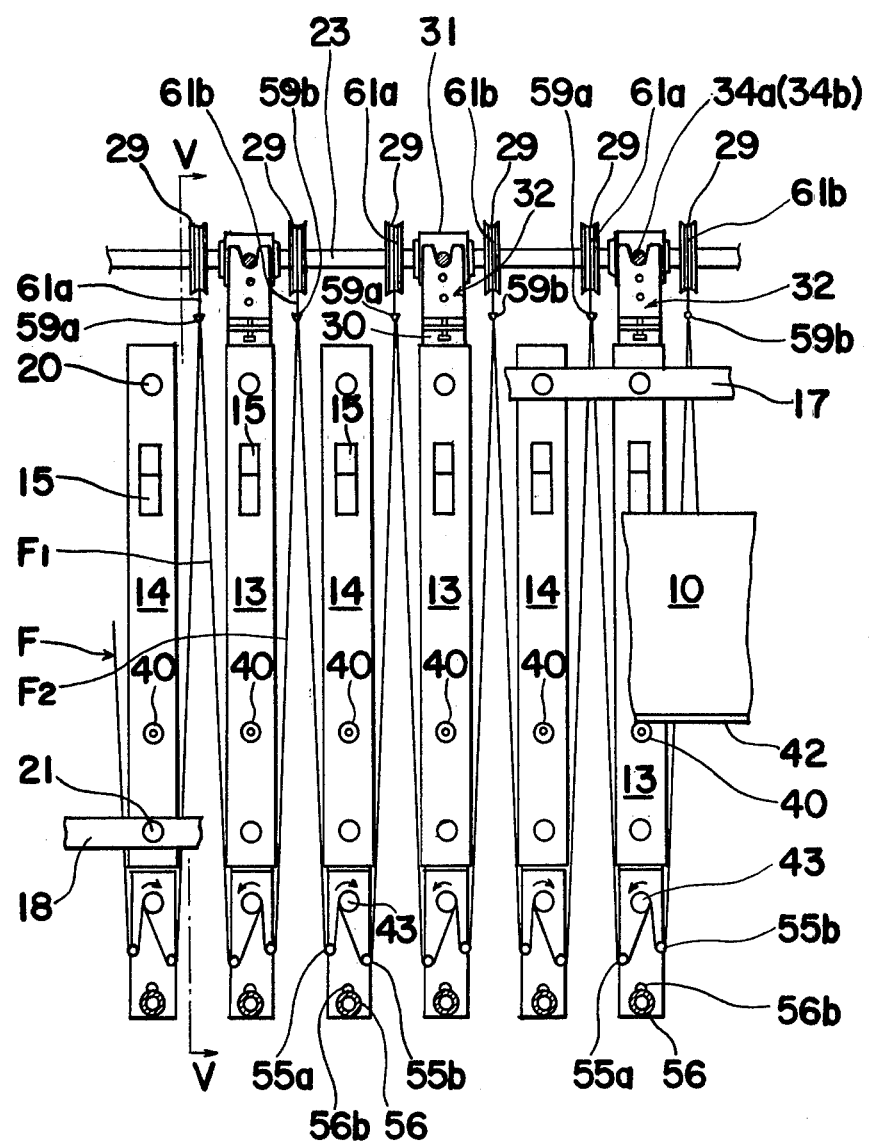
FIG. 4 is a side elevational view, schematically showing some of a group of filter plates employed in the filter press shown in FIG. 1.

The filter press further includes a spacer structure for maintaining any one of the plates 13 and 14 in equally spaced relation to the adjacent members of the plates 13 and 14 when and so long as the movable head 12a is moved to or held in the retracted position. This spacer structure comprises upper, intermediate and lower pairs of links 16, 17 and 18 having guide slots 16a, 17a and 18a at both end portions thereof into which bolt members 19, 20 and 21, one on each side of the machine, are inserted. These links of the pairs 16, 17 and 18 are so telescopically extendable that the movement of the movable head 12a can be transmitted to any one of the plates 13 and 14 in such a manner that, when the movable head 12a is moved from the retracted position, as shown in FIG. 4, towards the projected position as shown in FIG. 1, the plates 13 and 14 are compressed together to a substantially watertight closure between the fixed and movable heads 11a and 12a, and when the movable head 12a is moved from the projected position back towards the retracted position, the plates 13 and 14 are substantially simultaneously separated a predetermined distance from each other. For effecting the requisite movement of the movable head 12a the filter press is shown to have a hydraulic cylinder unit 22 carried by and positioned rearwardly of the rear machine frame 12.

The filter press has a winding mechanism for training filter mediums, as will be described later, between operative and inoperative positions. This winding mechanism comprises a pair of drive shafts 23 of polygonal, for example, hexagonal, cross section. These drive shafts 23 extend in spaced and parallel relation to each other between the front and rear machine frames 11 and 12 and above the plates 13 and 14 and are rotatably supported at their ends adjacent the front machine frame 11 by respective bearing blocks 24 rigidly mounted on said machine frame 11 in spaced relation to each other. The other ends of the respective drive shafts 23 rotatably extend through associated bearing blocks 25, rigidly mounted on the rear machine frame 12 in spaced relation to each other, and are in turn operatively coupled to a drive mechanism which includes an electric reversible motor 26, having a reduction gear unit (not shown), a bevel gear box 27 for each drive shaft 23 and a transmission system 28 for transmitting the rotation of the motor 26 to the drive shafts 23 through the associated bevel gear boxes 27. This drive mechanism is so designed that the drive shafts 23 can be rotated in the opposite directions relative to each other during rotation of the motor 26 irrespective of the direction of rotation of themotor 26, all of the components of the drive mechanism being supported on the rear machine frame 12.

Each of the drive shafts 23 has pairs of winding pulleys 29 mounted on the drive shaft 23 for rotation together with the drive shaft and also for movement in an axial direction of the drive shaft independently of the rotation of the drive shaft 23, the number of the pairs of the winding pulleys 29 being equal to the number of the filter plates 13 employed. Each pair of the winding pulleys 29 is operatively associated with the corresponding filter plate 13 in a manner as will subsequently be described with reference to FIGS. 11 and 12.

Figure 11:
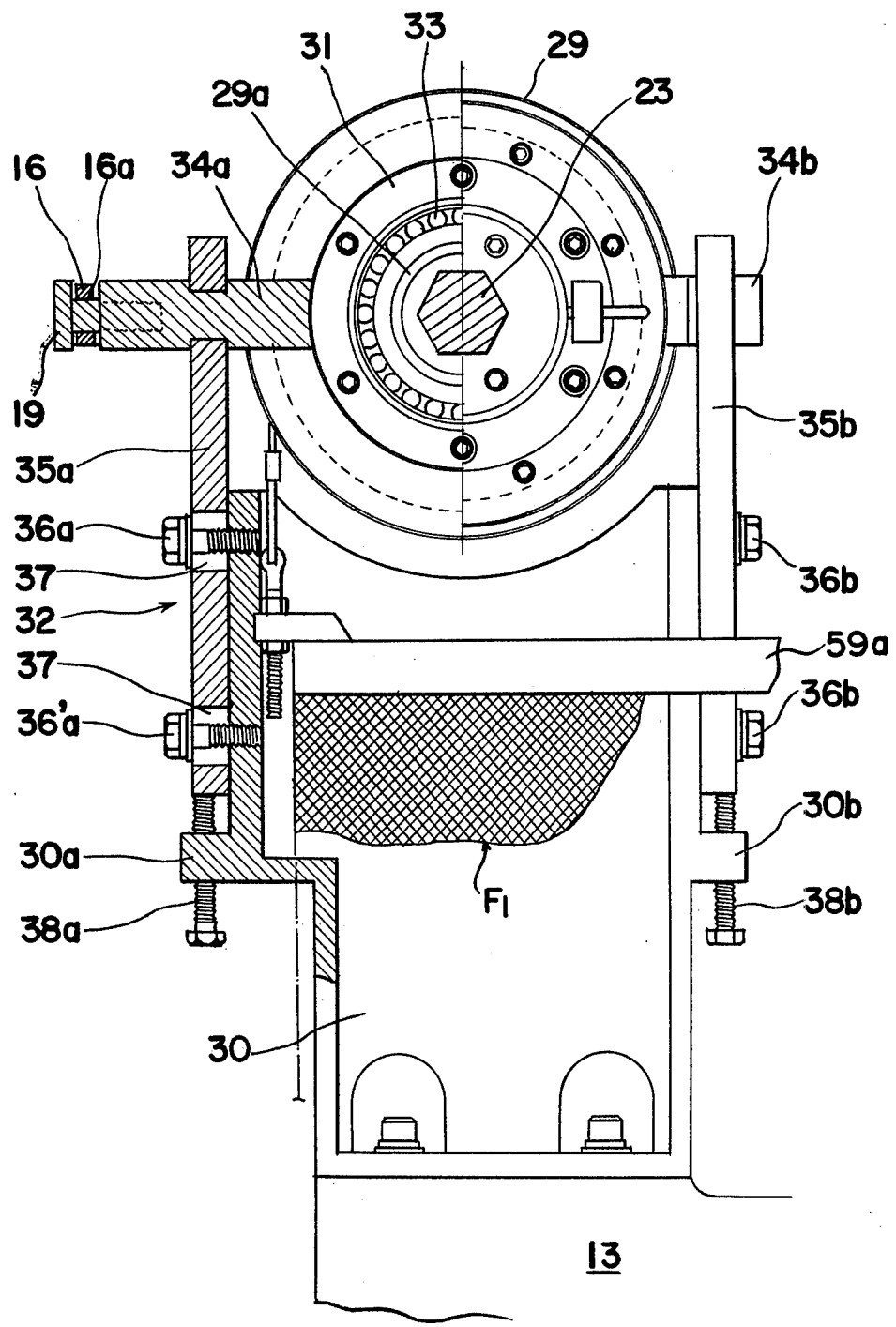
FIG. 11 is an end view of one of the winding pulleys carried by the filter plates, showing an adjustable connection between the winding pulley and the associated filter plate.
Figure 12:
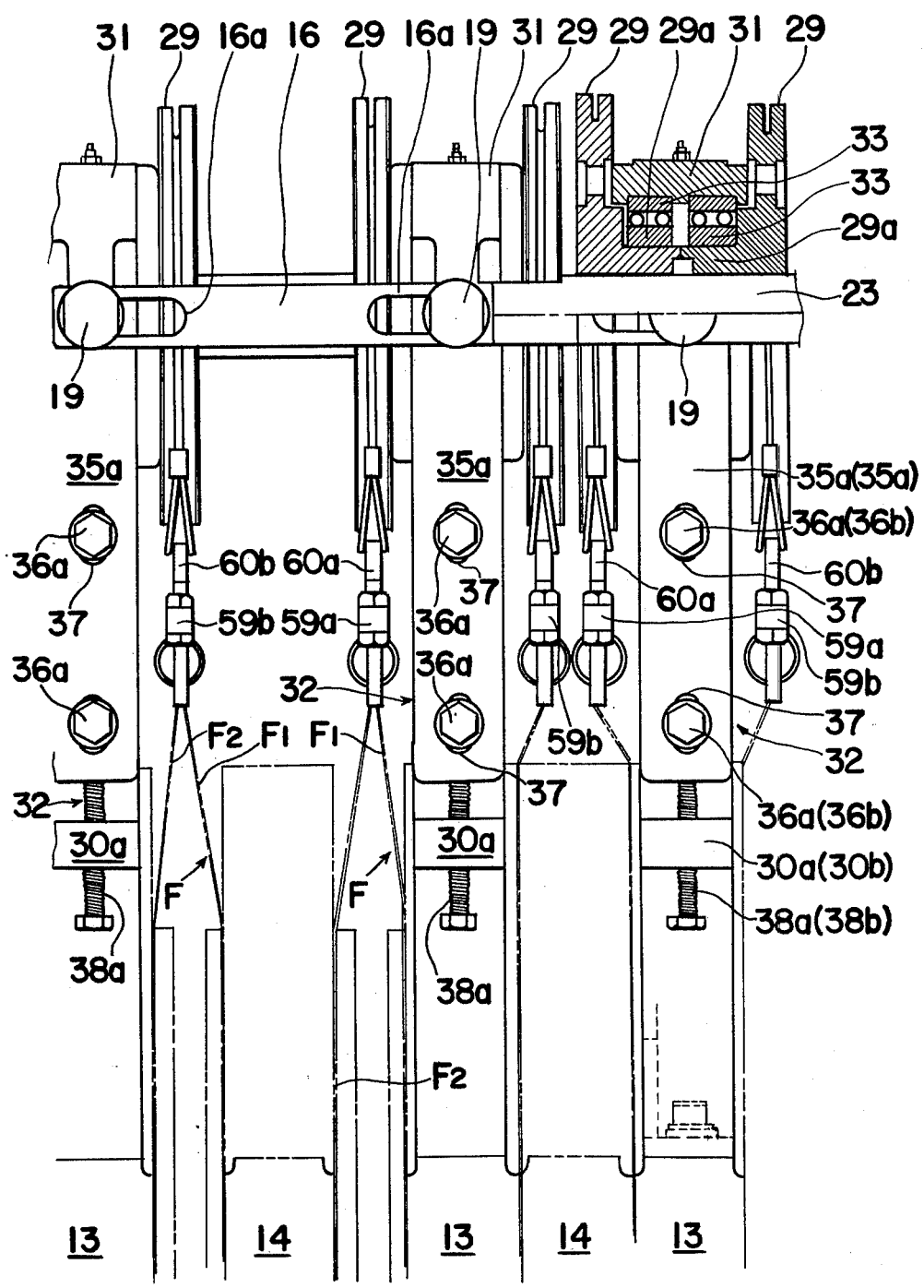
FIG. 12 is a side view of FIG. 11.

Each filter plate 13 has a pair of spaced arms 30, only one of which is shown in FIGS. 11 and 12, said arms 30 being rigidly mounted on the top of the filter plate 13 and spaced from each other a distance corresponding to the distance between the drive shafts 23. These arms 30 of pairs on the individual filter plates 13 are pivotally connected to respective sleeves 31, as will be described later, through associated height adjusting mechanisms 32. It is to be noted that, since all of the pivotal connection between the arms 30 of the pairs and the associated sleeves 31 through the height adjusting mechanisms 32 are of the same arrangement, only one pivotal connection will now be described with reference to FIGS. 11 and 12.

Referring now to FIGS. 11 and 12, each pair of the winding pulleys 29 axially movably and non-rotatably mounted on the associated drive shaft 23 have their bearing projections 29a extending in the opposite directions towards each other. The bearing sleeve 31 for each pair of the winding pulleys 29 is rotatably mounted on the bearing projections 29a of the pulleys 29 through ball-and-roller bearings 33, respectively mounted on the bearing projections 29a, and extends between the winding pulleys 29 of the pair. As best shown in FIG. 11, the sleeve 31 has a pair of stubs 34a and 34b projecting outwards from the outer peripheral surface thereof in the opposite direction away from each other, one of said stubs 34a having its free end to which the associated bolt member 19 is threaded through the guide slots 16a of the adjacent two of the upper links 16.

The height adjusting mechanism 32 for each arm 30 so far illustrated in FIGS. 11 and 12 comprises a pair of substantially elongated adjusting plates 35a and 35b. These adjusting plates 35a and 35b are respectively pivotally connected to the stubs 34a and 34b on the sleeve 31, downwardly extend therefrom in spaced relation to each other and are adjustably connected to the arm 30 at respective sides of the latter by means of respective pairs of adjustment bolts 36a and 36b which extend through guide slots in the individual adjusting plates 35a and 35b (only one pair of the guide slots, which are defined in the adjusting plate 35a, being shown by 37 in FIG. 11) and threaded to the arm 30. It is, therefore, clear that the adjustment of the position of any one of the filter plates 13 relative to the pulleys 29 of the corresponding pairs in a direction perpendicular to the longitudinal axis of the guide rails 10 can readily be performed by loosening the adjustment bolts 36a and 36b.

Referring still to FIGS. 11 and 12, for fine adjustment of the position of the filter plate 13 relative to the associated pulleys 29, the height adjusting mechanism 32 for each arm 30 may include a pair of fine adjustment bolts 38a and 38b threadingly carried by lateral projections 30a and 30b, which extend outwards from said arm 30 in the opposite directions away from each other and in a direction perpendicular to the longitudinal axis of any one of the drive shafts 23, and terminating in contact with the lower end faces of the adjusting plates 35a and 35b, respectively.

From the foregoing, it is clear that the pulleys 29 of the pairs, which are axially movably mounted on the associated drive shafts 23, can smoothly be moved along the drive shafts 23 simultaneously with the movement of any one of the plates 13 and 14 even though the latter tend to swing, because any one of the filter plates 13 is permitted to pivot about the longitudinal axes of the stubs 34a and 34b.

Figure 13:
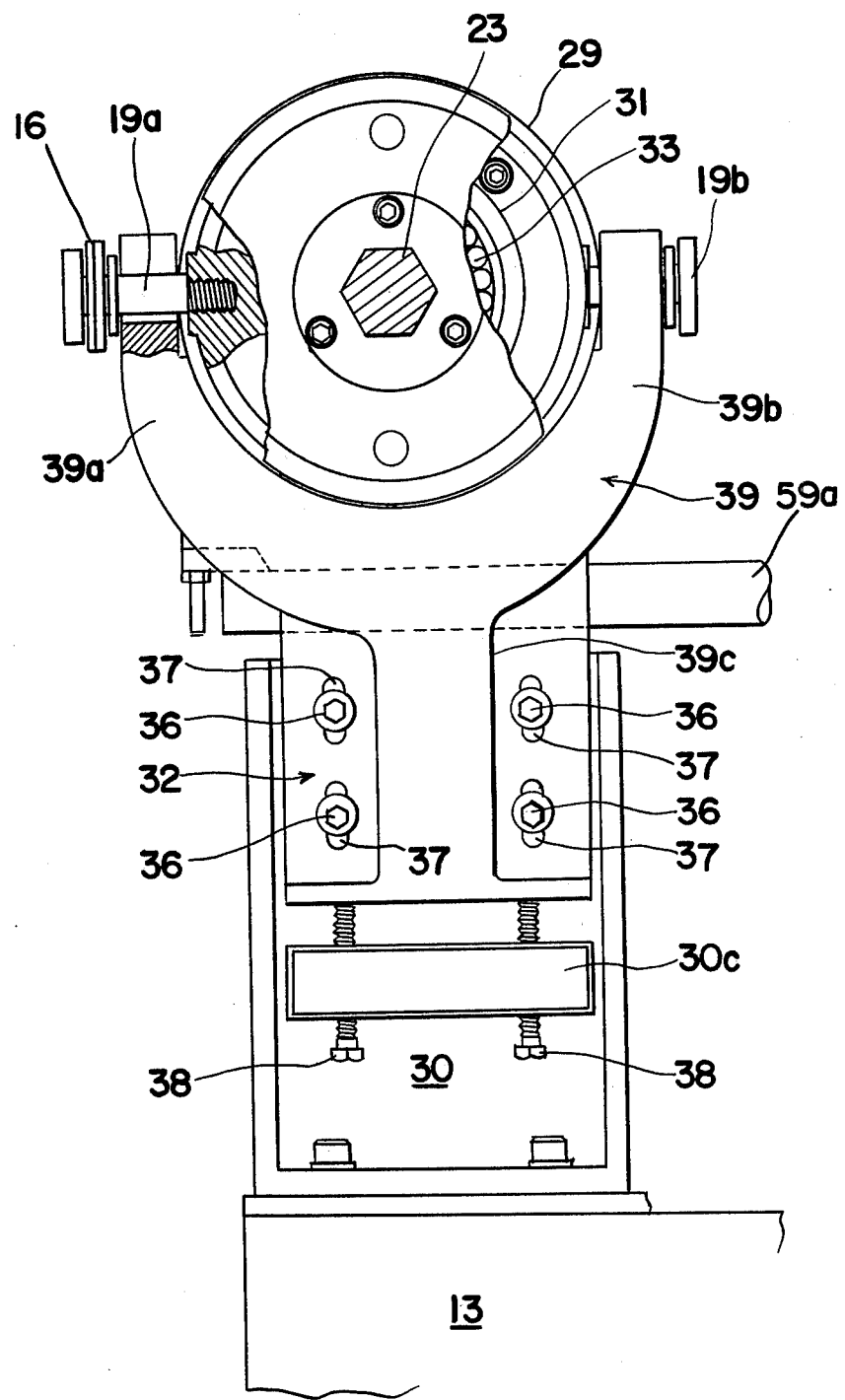
FIG. 13 is a view similar to FIG. 11, showing a modified form of the adjustable connection between the winding pulley and the associated filter plate.
Figure 14:
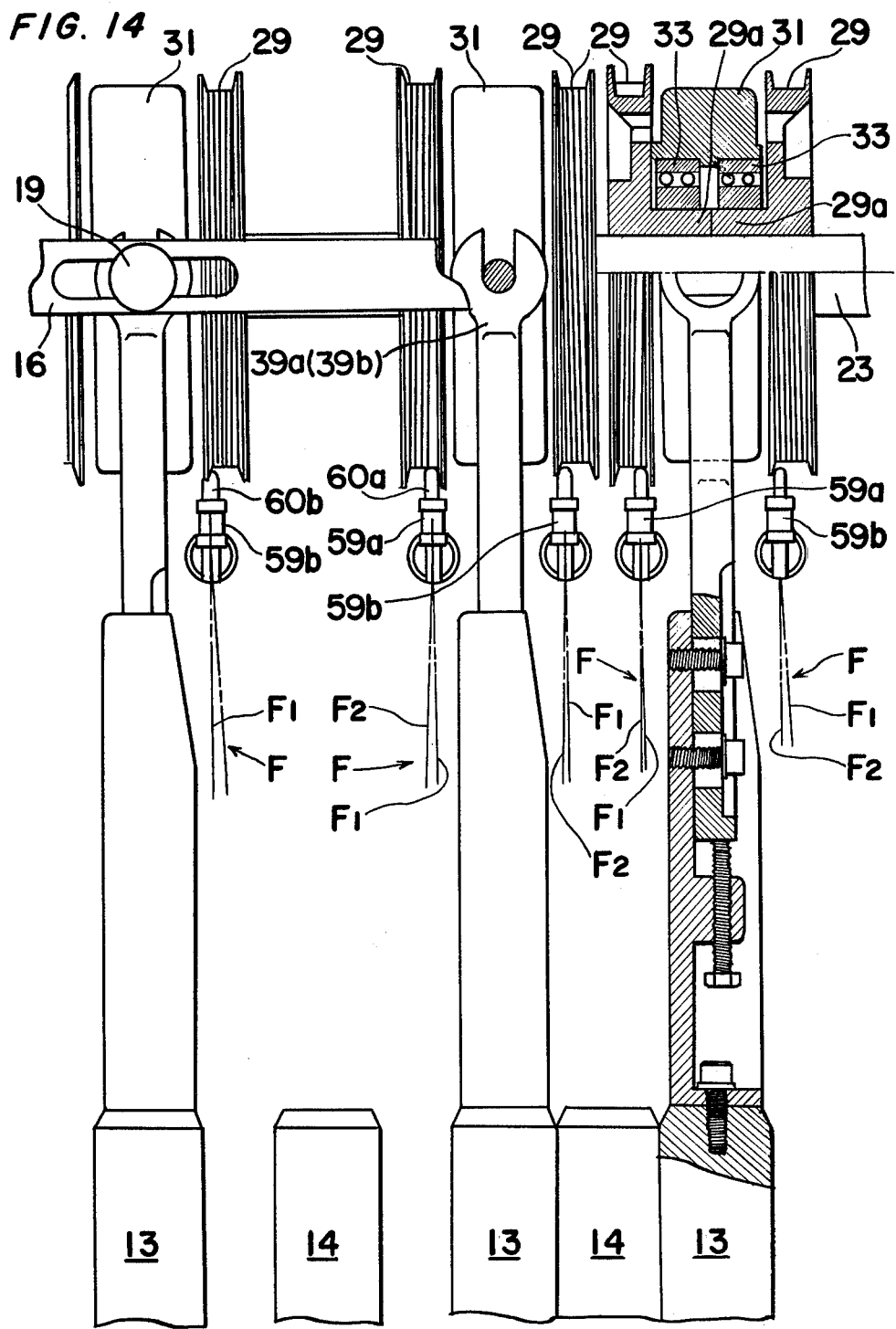
FIG. 14 is a side view of FIG. 13.

Alternatively, instead of the height adjusting mechanism 32 of the construction as best shown in FIGS. 11 and 12, the height adjusting mechanism of a construction shown in FIGS. 13 and 14 may be employed for each arm 30. Referring now to FIGS. 13 and 14, the height adjusting mechanism 32 comprises a substantially Y-shaped adjusting member 39 of one-piece construction having a pair of spaced bearing arms 39a and 39b, connected integrally with each other to assume a substantially U-shaped configuration, and a leg 39c. As best shown in FIG. 14, the free ends of the respective bearing arms 39a and 39b have bearing recesses into which set bolts 19a and 19b, threaded to the sleeve 31 and outwardly extending therefrom in the opposite directions away from each other, are respectively pivotally received. It is to be noted that any one of the seat bolts 19a and 19b employed in the example of FIGS. 13 and 14 corresponds in function to that of the combined members 19 and 34a or 34b employed in the example shown in FIGS. 11 and 12.

The leg 39c of the substantially Y-shaped adjusting member 39 is adjustably connected to the arm 30 by means of a plurality of, for example, four, adjustment bolts 36 extending through guide slots 37, defined in said leg 39c, and threaded to the arm 30, respectively. As is the case with the height adjusting mechanism shown in FIGS. 11 and 12, the height adjusting mechanism 32 shown in FIGS. 13 and 14 may have one or more fine adjustment bolts 38 for the purpose as described with reference to FIGS. 11 and 12. These fine adjustment bolts 38 are shown to be adjustably extending through a carrier block 30c, extending widthwise of the arm 30 and outwardly protruding in a direction parallel to the longitudinal axis of any one of the drive shafts 23, and terminate in contact with the free end face of the leg 39c.

Figure 10:
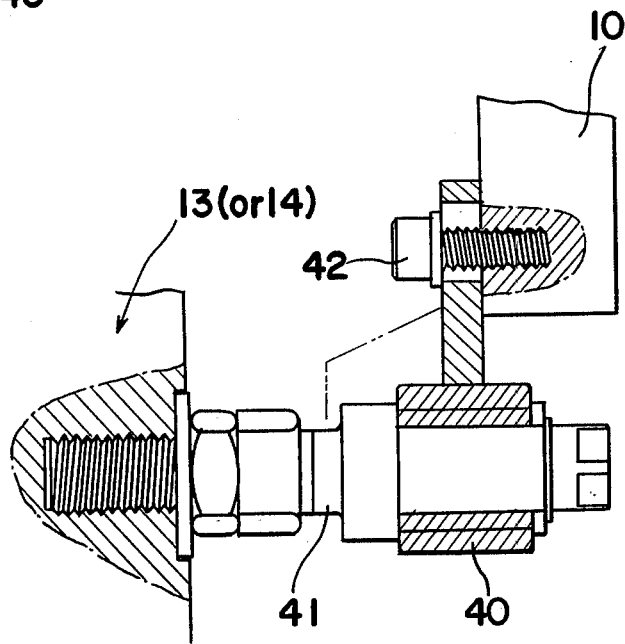
FIG. 10 is a sectional view showing a portion of an adjustable guide mechanism for each filter plate, which is employed in the filter press shown in FIG. 1.

Irrespective of whether the height adjusting mechanism employed is constructed such as shown in FIGS. 11 and 12 or whether the same is constructed such as shown in FIGS. 13 and 14, a more smooth movement of the filter plates 13 can be facilitated by the employment of a lower guide mechanism for each filter plate as best shown in FIG. 10. This lower guide mechanism comprises, as best shown in FIG. 10, a pair of rollers 40 on each side of any one of the filter plates 13, which are rotatably and axially non-movably mounted on respective spindles 41, laterally outwardly projecting from the associated filter plate 13 in the opposite directions away from each other and positioned below the respective guide rails 10. Cooperative with the pair of the rollers 40 for each filter plate 13 is elongated rail members 10a which are respectively secured to the guide rails 10 by means of adjustment bolts 42 for adjustment in a direction perpendicular to the longitudinal axis of any one of the spindles 41.

It is to be noted that a lower guide mechanism similar in construction and function to the lower guide mechanism described above with reference to FIG. 10 may also be employed in any one of the squeeze-filter plates 14.

Figure 6:
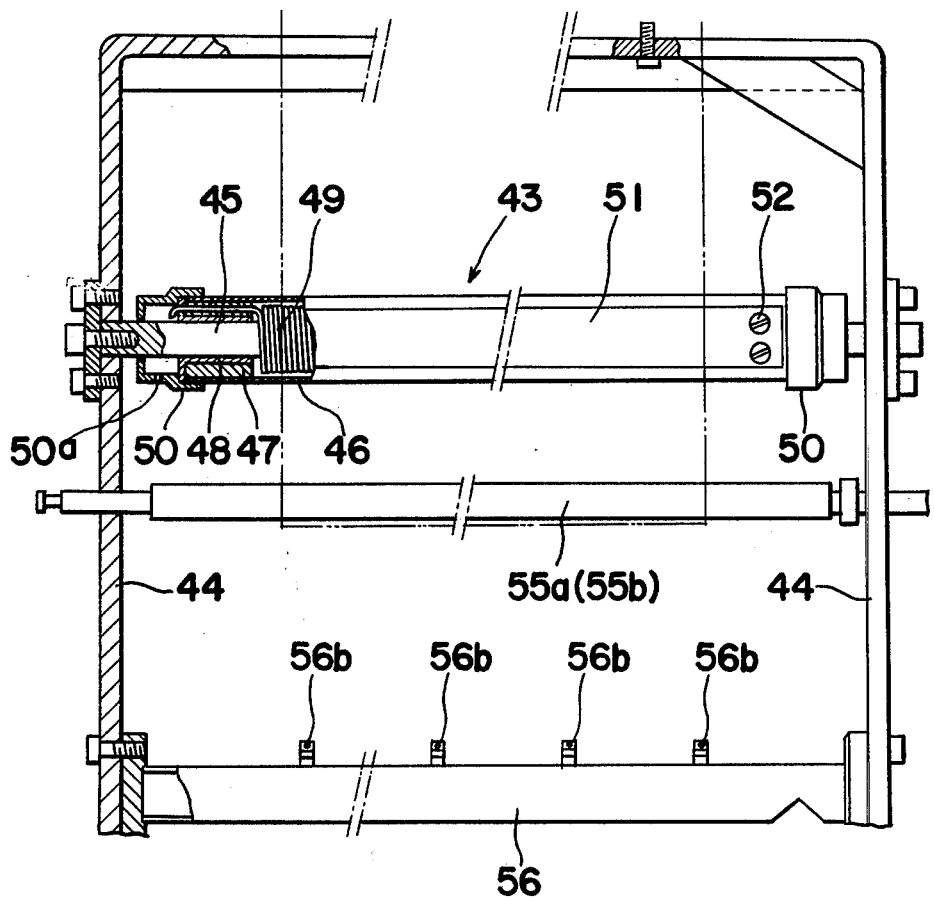
FIG. 6 is a longitudinal side view, with a portion broken away, of a tensioning and winding roll assembly carried by each of the filter plates.

Referring now to FIGS. 4 to 6, a tensioning and winding roll assembly, generally designated by 43 and employed for each plate 13 and 14, is supported below the filter plate 13 or 14 by means of a pair of elongated leg members 44 rigidly secured to and downwardly extending from the plate 13 or 14 in equally spaced relation to each other. This tensioning and winding roll assembly 43 comprises, as best shown in FIG. 6, a shaft 45, having its opposed ends rigidly secured to and non-rotatably supported by the adjacent leg members 44, and a hollow cylinder 46 having an inner diameter greater than the diameter of the shaft 45 and rotatably mounted on the shaft 45 through a bushing 47 and a flanged sleeve 48, said bushing 47 and flanged sleeve 48 being, while said bushing 47 is rigidly mounted on the flanged sleeve 48 which is in turn rotatably mounted on the shaft 45, received into and rigidly secured to the hollow cylinder 46 at each end portion of the latter.

The tensioning and winding roll assembly 43 further comprises a torsion spring 49 mounted around the shaft 47 within the hollow of the cylinder 46 and having its opposed ends extending through the bushings 47 and engaged to flange portions of the associated flanged sleeves 48, respectively. A substantially intermediate portion of the torsion spring 49 is so rigidly connected to the shaft 45 that, after the cylinder 46 has been rotated in one direction against the torsion spring 49 by the application of an external force and the external force so applied has subsequently been removed, the cylinder 46 tends to rotate about the shaft 45 in the opposite direction by the action of a spring force accummulated on the torsion spring 49 during the rotation of the cylinder 46 in said one direction.

The hollow cylinder 46 is of a length greater than the width of the filter medium, as will be described later, and has its opposed ends received in respective caps 50. These caps 50 so far illustrated in FIG. 6, receive and are secured to the respective ends of the hollow cylinder 46 and have drain holes 50a for discharging to the outside washing liquid which may leak into respective spaces within the caps 50.

Figure 7:
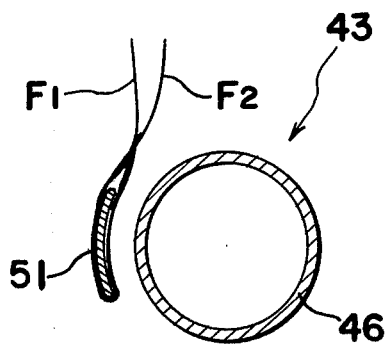
FIG. 7 is a schematic sectional view of the tensioning and winding roll assembly, showing a method of securing the filter medium to the tensioning and winding roll assembly shown in FIG. 6.

For securing the filter medium to the tensioning and winding roll assembly 43, the roll assembly 43 for each plate 13 and 14 includes a fixture bar 51. This fixture bar 51 is, after the filter medium has been anchored to said fixture bar 51 as shown in FIG. 7, secured to the hollow cylinder 46 with its opposed end portions connected thereto by means of a plurality of set screws 52. In securing the fixture bar 51 to the hollow cylinder 46, the outer peripheral surface of the hollow cylinder 46 may have an axially extending groove (not shown) for accommodation of the fixture bar 51 therein when the fixture bar 51 having the filter medium anchored thereto is connected thereto.

Figure 8:
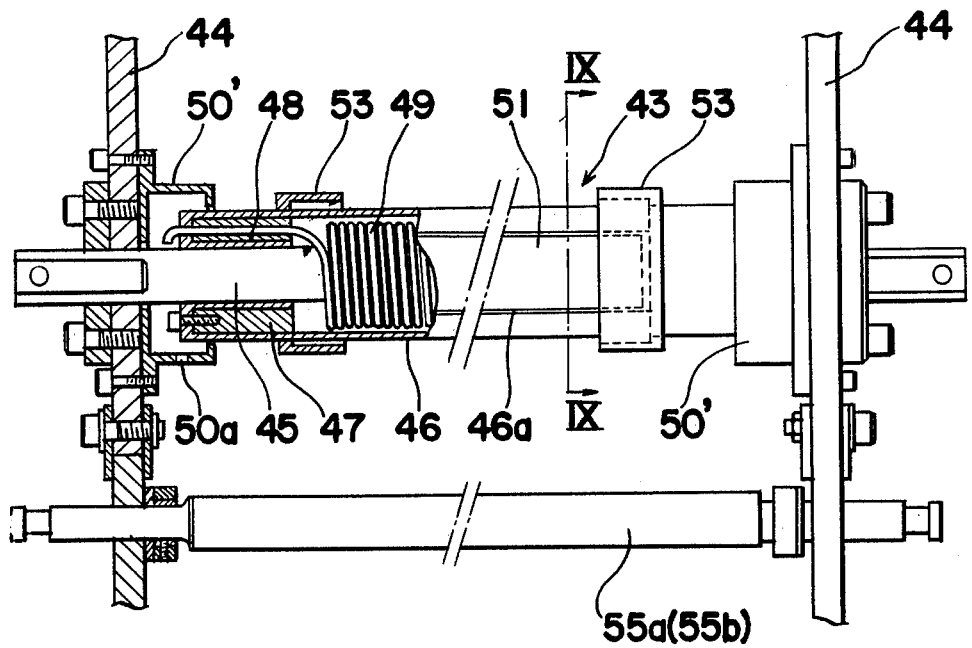
FIG. 8 is a view similar to FIG. 6, showing a modified form of the tensioning and winding roll assembly.

As shown in FIG. 8, the end caps corresponding in function to the end caps 50 shown in FIG. 6 may be secured to the leg members 44, respectively as shown by 50'.

Figure 9:
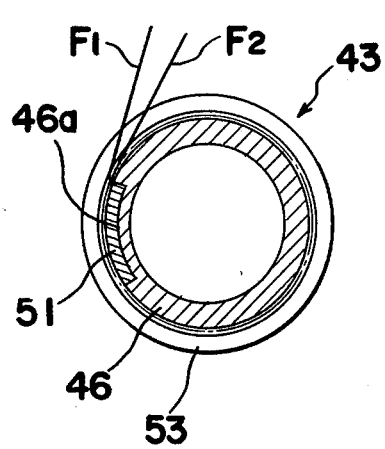
FIG. 9 is a view similar to FIG. 7, showing another method of securing the filter medium to the tensioning and winding roll assembly of a construction shown in FIG. 8.

Instead of securing the fixture bar 51 by the use of the set screws 52 such as shown in FIG. 6, another method can be employed, which will now be described with reference to FIGS. 8 and 9. In the example shown in FIGS. 8 and 9, the cylinder 46 has an axially extending groove 46a into which the fixture bar 51 after having had the filter medium anchored thereto as shown in FIG. 9 is placed. For avoiding separation of the fixture bar 51 placed in the axially extending groove 46a, the hollow cylinder 46 carries a pair of spaced fixture sleeves 53 mounted thereon, each of said fixture sleeves 53 having one end remote from the other fixture sleeve 53 internally threaded so that, by rotating the fixture sleeve 53 about the longitudinal axis of the hollow cylinder 46, it can be moved in a direction close to and away from the other fixture sleeve 53. The fixture bar 51, to which the filter medium is anchored, can firmly be held in position on the hollow cylinder 46 when and after it has been placed into the axially extending groove 46a, while the fixture sleeves 53 are threadingly moved away from each other, and the fixture sleeves 53 have subsequently been threadingly moved in a direction close towards each other with the opposed end portions of the fixture bar 51 positioned respectively inside of the fixture sleeves 53.

Irrespective of whether the tensioning and winding roll assembly 43 is constructed as shown in FIG. 6 or whether the same is constructed as shown in FIG. 8, the spaced leg members 44 carry a pair of juxtaposed guide rolls 55a and 55b positioned below the tensioning and winding roll assembly 43 and having their opposed end portions respectively journalled to the leg members 44. The leg member 44 also carry a washing liquid supply pipe 56 positioned below the guide rolls 55a and 55b and havng its opposed ends closed and rigidly connected to the respective leg members 44. A portion of the supply pipe 56 adjacent one end thereof has a coupler 56a to which a flexible tube 57 is connected as shown in FIGS. 2 and 3. It is to be noted that the flexible tubes 57 extending from all of the couplers 56a of the supply pipes 56 one for each pair of the leg members 44 are connected to a common relay coupler 58 which is secured in position to the machine frame which is in turn communicated to a source of washing liquid (not shown).

Referring still to FIGS. 4 to 6, the supply pipe 56 carried by each pipe of the leg member 44 has a plurality of equally spaced spray nozzles 56b so rigidly mounted thereon and so upwardly oriented that washing liquid supplied under pressure into the supply pipe 56 can be sprayed towards the filter medium as will be described later.

Hereinafter, the manner by which each of the filter mediums one for each plate 13 and 14 will now be described. As best shown in FIGS. 4 and 5, each filter medium, generally indicated by F, is composed of a pair of elongated webs of filter cloth $F_1$ and $F_2$. These filter webs $F_1$ and $F_2$ for each plate 13 and 14 have their first ends, joined together and anchored to the tensioning and winding roll assembly 43 in such a manner as shown in FIG. 7 or FIG. 9, after having turned around the respective guide rolls 55a and 55b immediately below such tensioning and winding roll assembly 43. The filter webs $F_1$ and $F_2$ also have their second ends opposed to said first ends, respectively, which sounds ends are spaced from each other and connected to respective transverse support bars 59a and 59b with the plate 13 or 14 positioned therebetween. As best shown in FIGS. 5, 11, 12 and 14, these transverse support bars 59a and 59b respectively positioned frontwardly and rearwardly of each filter plate 13 or rearwardly and frontwardly of each squeeze-filter plate 14 are connected to the respective pairs of the winding pulleys 29 on the associated drive shafts 23 by means of pairs of cables 61a and 61b. Each of the cables 61a and 61b has one end connected to an eyelet coupler 60a and 60b, rigidly mounted on each end of the transverse support bar 59a or 59b, and the other end rigidly secured to the associated winding pulley 29.

It is to be noted that, in the condition as shown particularly in FIGS. 4 and 5, the filter webs $F_1$ and $F_2$ are held in their operative position wherein respective major portions of the filter webs $F_1$ and $F_2$, which extend between the support bars 59a and the guide rolls 55a and between the support bars 59b and the guide rolls 55b, cover the front and rear surfaces of the plates 13 and 14. During the condition, such as shown in FIGS. 4 and 5, wherein the filter webs $F_1$ and $F_2$ are held in the operative position irrespective of the position of the movable head 12a, the torsion springs 49 (FIGS. 6 and 8) in the respective roll assemblies 43 are charged to exert a spring force tending the roll assemblies 43 to rotate in a winding direction as shown by the arrows in FIG. 4.

Each of the plates 13 and 14 is of any known construction and, therefore, the details thereof are herein omitted for the sake of brevity. However, it is to be understood that each of the plates 13 and 14 has a slurry passage through which the slurry to be filtered flows under pressure and a filtrate outlet leading to a drain pipe 62 secured to one side of the plate as shown in FIGS. 1 to 3, through which drain pipe 60 flows a filtrate onto a recovery trough 63. It is further to be understood that the slurry to be filtered is supplied under pressure from an inlet 64 (FIGS. 1 and 3) towards the slurry passages in the plates 13 and 14, while said plates 13 and 14 are compressed together and the slurry passages are aligned with each other, through slurry distributors 65 (FIG. 5) one for each filter web $F_1$ or $F_2$. Each of the distributors 65 is, as is well known to those skilled in the art, constructed such that, when and so long as the plates 13 and 14 are compressed together with the movable head 12a held in the projected position as shown in FIG. 1 and the filter webs $F_1$ and $F_2$ are held in their operative position, the slurry flowing under pressure through the slurry passages in the respective plates 13 and 14 can be distributed into between the filter webs $F_2$ and the filter webs $F_1$ which are held in contact with such filter webs $F_2$.

Referring to FIGS. 1 to 3, reference numeral 66 represents a drain trough through which the used washing liquid after having been sprayed from the spray nozzles 56b for washing the filter webs $F_1$ and $F_2$ as the latter travel around the associated guide rolls 55a and 55b is discharged to the outside. Reference numeral 67 represents inlet and outlet for a pressurized liquid medium to be supplied to and discharged from the squeeze-filter plates 14 during squeeze-filtration.

The operation of the filter press so constructed as hereinbefore described with reference to FIGS. 1 to 14 will now be described.

As is well known to those skilled in the art, as filtration of the slurry progresses, a cake composed of some of solid substances which have not penetrated through the interstices of filter webs $F_1$ and $F_2$ is built up between the major portion of any one of the filter webs $F_2$ and the major portion of the filter web $F_1$ which is adjacent said any one of the filter webs $F_2$. In order to remove the cakes so built up between the major portions of the filter webs $F_2$ and that of the adjacent filter webs $F_1$, starting from the condition as shown in FIG. 1, the hydraulic cylinder unit 22 is, after the supply of the slurry to the slurry supply inlet 64 has been interrupted, operated to move the movable head 12a from the projected position back towards the retracted position. The movement of the movable head 12a so effected towards the retracted position is substantially sequentially transmitted to the individual plates 13 and 14 through the links 16, 17 and 18 and, therefore, the plates 13 and 14 can be separated from each other with each two adjacent members thereof spaced the predetermined distance as shown in FIG. 4. During separation of the plates 13 and 14 in the manner as hereinabove described, any one of the filter webs $F_2$ and the adjacent filter web $F_1$ which has substantially contacted said any one of the filter webs $F_2$ during the filtering operation are outwardly pivoted in the opposite directions about the corresponding transverse support bar 59a or 59b, as best shown in FIG. 4, to which said any one of the filter webs $F_2$ and said adjacent filter web $F_1$ are connected.

In the condition as shown in FIG. 4, some of the cakes situated between the adjacent major portions of the respective filter webs $F_2$ and $F_1$ and sticking thereto may partially fall by gravity onto the trough 66 if they are of an amount and/or size hard to support their own weight. Irrespective of this, after the plates 13 and 14 have been separated from each other, the electric reversible motor 26 is rotated in one direction so that two groups of the pulleys 29 on the respective drive shafts 23 (one group on each drive shaft) can be rotated in respective directions opposite to each other as shown by the arrows in FIG. 5.

Since each of the tensioning and winding roll assemblies 43 is so designed that, when and so long as the filter webs $F_1$ and $F_2$ of the corresponding pair, which are connected thereto, are held in their operative position as shown in any one of FIGS. 1, 4 and 5, the tensioning and winding roll assembly has a tendency to wind up the filter webs $F_1$ and $F_2$ of said corresponding pair to bring the latter to their inoperative position with the support bars 59a and 59b of the associated pair positioned below the plate 13 or 14 and adjacent the guide rolls 55a and 55b. Therefore, irrespective of the position of the filter webs $F_1$ and $F_2$, the latter can always be held under tension by the effect of the winding force exerted by the tensioning and winding roll assemblies 43.

In addition thereto, upon rotation of the winding pulleys 29 of the two groups in the directions respectively shown by the arrows in FIG. 5, the filter webs $F_1$ and $F_2$ of the pairs are wound up around the associated tensioning and winding roll assemblies 43 while the cables 61a and 61b are at the same time pulled outwards, whereby the filter webs $F_1$ and $F_2$ of the pairs can be brought to the inoperative position. It is to be noted that, prior to or shortly after the start of movement of the filter webs $F_1$ and $F_2$ of the pairs from the operative position towards the inoperative position as pulled by the corresponding tensioning and winding roll assemblies 43, a washing liquid is sprayed from the spray nozzles 56b substantially towards the guide rolls 55a and 55b.

From the foregoing, it is clear that, as any one of the pairs of the filter webs $F_1$ and $F_2$ are wound around the corresponding tensioning and winding roll assembly 43 past around the respective guide rolls 55a and 55b while they are maintained taut or under tension, the cake sticking in part to the filter web $F_2$ of said any one of the pairs and in part to the adjacent filter web $F_1$ can be forced to separate from the filter webs and fall onto the trough 66. More specifically, because the filter webs $F_1$ and $F_2$ of the pairs are held taut or under tension and because the filter webs $F_1$ and $F_2$ are, while they are wound around the corresponding tensioning and winding roll assembly 43, turned around the respective guide rolls 55a and 55b following a substantially U-shaped path, a relative slide or "surface avalanche" takes place between substantial halves of the cakes respectively sticking to the filter webs $F_1$ and $F_2$ of said any one of the pairs. This relative slide or surface avalanche facilitates separation of the cakes from the filter webs $F_2$ and $F_1$. Furthermore, since the washing liquid is applied to the filter webs passing around the guide rolls 55a and 55b, any residue of the cakes can satisfactorily be removed. It is to be noted that the used washing liquid and the separated cakes can be recovered onto the trough 66 and then discharged in any suitable manner to the outside of the machine.

After the cake discharge and the filter medium washing have completed, the electric reversible motor 26 is rotated in the opposite direction so that the two groups of the winding pulleys 29 on the respective drive shafts 23 can be rotated counter to the directions indicated by the arrows in FIG. 5, whereby the filter webs $F_1$ and $F_2$ of the pairs which have been wound around the respective tensioning and winding roll assemblies 43 are drawn out of the tensioning and winding roll assemblies 43 and upwardly shifted towards the operative position. Application of the washing liquid from the spray nozzles 56b may be interrupted either shortly before the start of movement of the filter webs $F_1$ and $F_2$ from the inoperative position back towards the operative position or shortly after the filter webs $F_1$ and $F_2$ have been returned to the operative position.

Subsequent to the return of the filter webs $F_1$ and $F_2$ back to the operative position, the hydraulic cylinder unit 22 is operated to move the movable head 12a from the retracted position towards the projected position to compress the plates 13 and 14 together to a substantially watertight closure between the fixed and movable heads 11a and 12a. Thereafter, the next filtering operation can be carried out.

It is to be noted that, although the filter press of the construction shown in FIGS. 1 to 14 and according to the first preferred embodiment of the present invention has been described as having the filter plates 13 and the squeeze-filter plates 14 which are alternately positioned between the fixed and movable heads 11a and 12a, the squeeze-filter plates 14 may be omitted. In this case, one of the winding pulleys 29 of each pair, which has been illustrated as positioned between and above each adjacent pair of the plates 13 and 14, and its associated parts are not necessary.

Alternatively, each of the squeeze-filter plates 14 may be constructed in a manner similar to the filter plate 13 as shown in FIG. 11 or FIG. 13 so that the plates 13 and 14 can be individually suspended from the respective pulleys 29 of the two groups, one group on each drive shaft 23, through similar height adjusting mechanisms.

Figure 15:
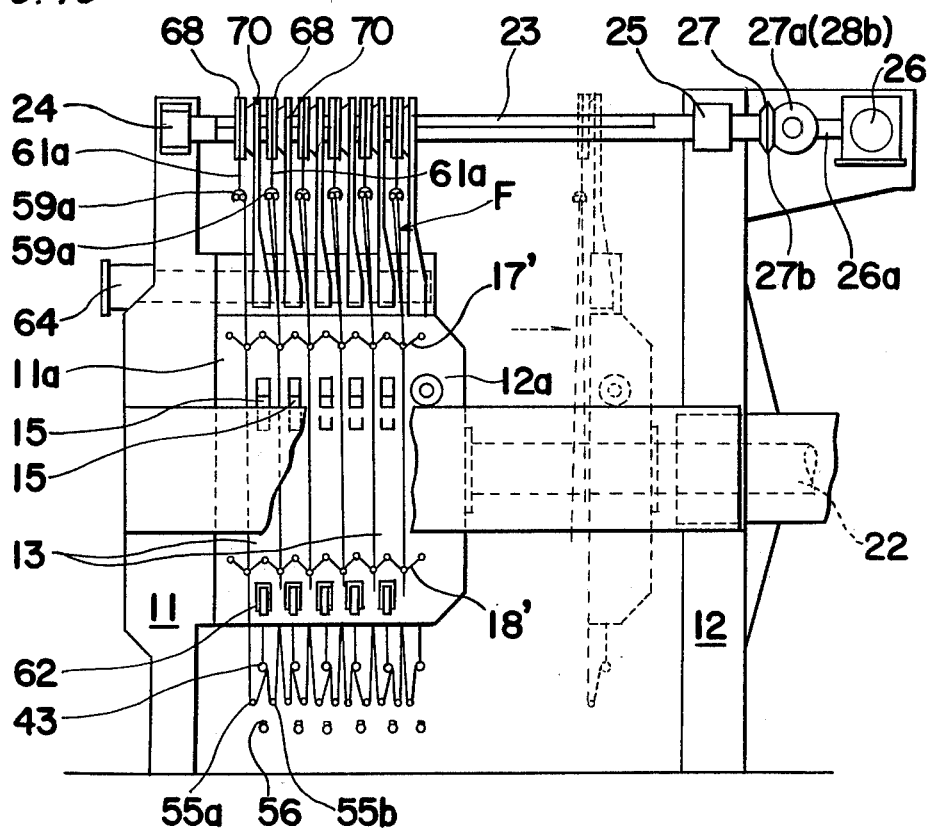
FIG. 15 is a schematic side view of the filter press according to another preferred embodiment of the present invention.
Figure 16:
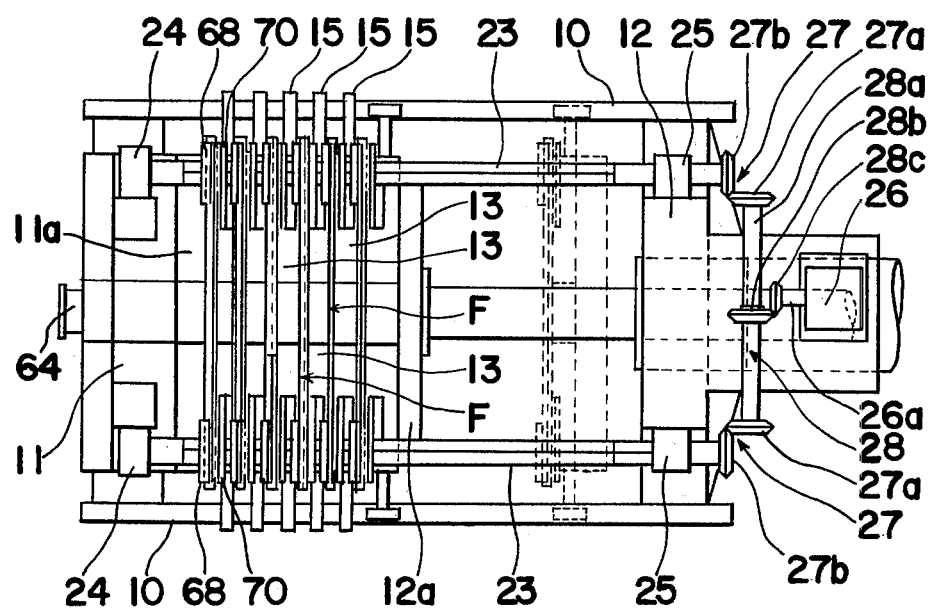
FIG. 16 is a top plan view of the filter press shown in FIG. 15.
Figure 17:
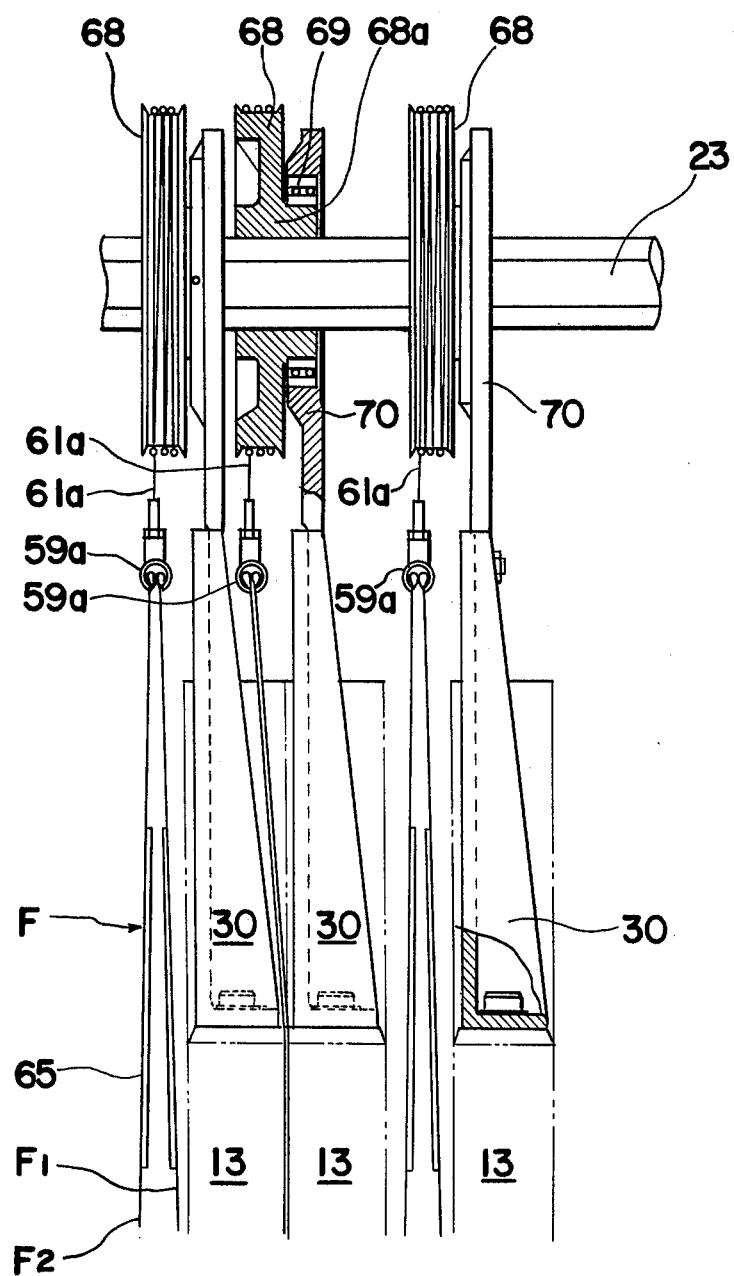
FIG. 17 is a side view, on an enlarged scale, of a portion of some winding pulleys employed in the filter press shown in FIG. 15, showing the details of connection between the winding pulleys and the respective filter plates.

Referring now to FIGS. 15 to 17 showing a second preferred embodiment of the present invention, except for the filter press shown to have only the filter plates 13 which are arranged face-to-face relation between the fixed and movable heads 11a and 12a, there is a difference in construction of the filter medium winding mechanism between the filter press shown in FIGS. 1 to 14 and that shown in FIGS. 15 to 17.

As best shown in FIG. 17, the winding mechanism comprises a winding pulley 68 provided on each arm 30, that is, two winding pulleys 68 for each filter plate 13, said pulley 68 having a hub 68a through which said pulley 68 is mounted on a corresponding one of the drive shafts 23 for rotation together with said drive shaft 23 and also for sliding movement in an axial direction of the drive shaft 23. As is the case with each pulley 29 in the foregoing embodiment, one end of the cable 61a opposed to the other end connected to the associated support bar 59a is rigidly connected to the pulley 68 in any suitable manner.

Mounted on the hub 68a is a ball-and-roller bearing 69 having inner and outer races with a plurality of balls or rollers interposed between said inner and outer races, said inner race being rigidly mounted on or pressure-fitted on the hub 68a. Rigidly mounted or pressure-fitted on the outer race of the bearing 69 is a suspension plate 70 having one end portion mounted on the outer race of the bearing 69 and the other end connected to the associated arm 30. The connection between the other end portion of the suspension plate 70 and the arm 30 may be done in a manner similar to the adjustable connection such as shown in FIGS. 11 and 12 or FIGS. 13 and 14. Alternatively, the suspension plate 70 may be an integral part of the arm 30.

From the foregoing, it is clear that roration of the two groups of the pulleys 68 in the opposite directions results in movement of the filter mediums, particularly, the filter webs $F_1$ and $F_2$ between the operative and inoperative positions as described in connection with the first preferred embodiment of the present invention.

As best shown in FIGS. 15 and 16, while the transmission system 28 in the embodiment shown in FIGS. 1 to 14 has been shown as composed of an endless drive medium such as an endless belt or chain, the transmission system 28 employed in the second preferred embodiment of the present invention comprises a transmission shaft 28a having a bevel gear 28b rigidly mounted thereon at a position substantially intermediately of the length of said shaft 28a. The bevel gear 28b on the transmission shaft 28a is held in constant mesh with a bevel gear 28c rigidly mounted on a motor drive shaft 26a of the electric reversible motor 26. Each of the gear boxes 27 is shown to have a bevel gear 27a rigidly mounted on the transmission shaft 28a and held in constant mesh with a corresponding bevel gear 28b rigidly mounted on the drive shaft 23.

The spacer structure shown in FIGS. 15 and 16 comprises upper and lower pairs of articulated links, one pair on each side of the filter press, which are operatively connected to the individual filter plates 13 in a manner similar to the telescopically extendable links employed in the foregoing embodiment of FIGS. 1 to 14. However, it is to be noted that, instead of the articulated links, the telescopically extendable links may equally be employed in the filter press of FIGS. 15 to 17.

In the embodiment shown in FIGS. 18 to 20, the electric reversible motor 26 forming a part of the drive mechanism is shown to be carried by the movable head 12a and, therefore, a transmission system quitely different in construction from the transmission system 28 employed in any one of the foregoing embodiments is employed, which will now be described.

Figure 18:
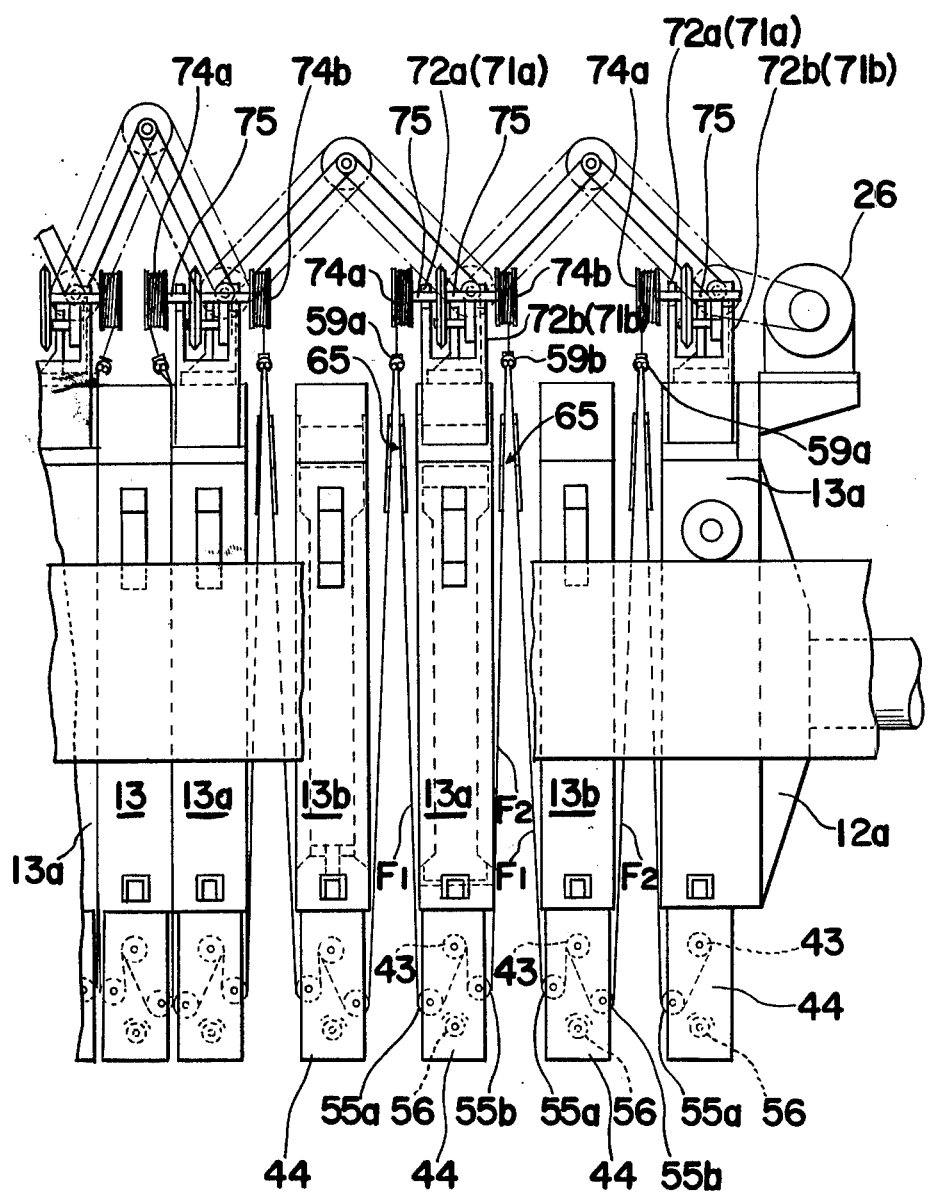
FIG. 18 is a schematic side view of a portion of the filter press according to a further preferred embodiment of the present invention.
Figure 19:
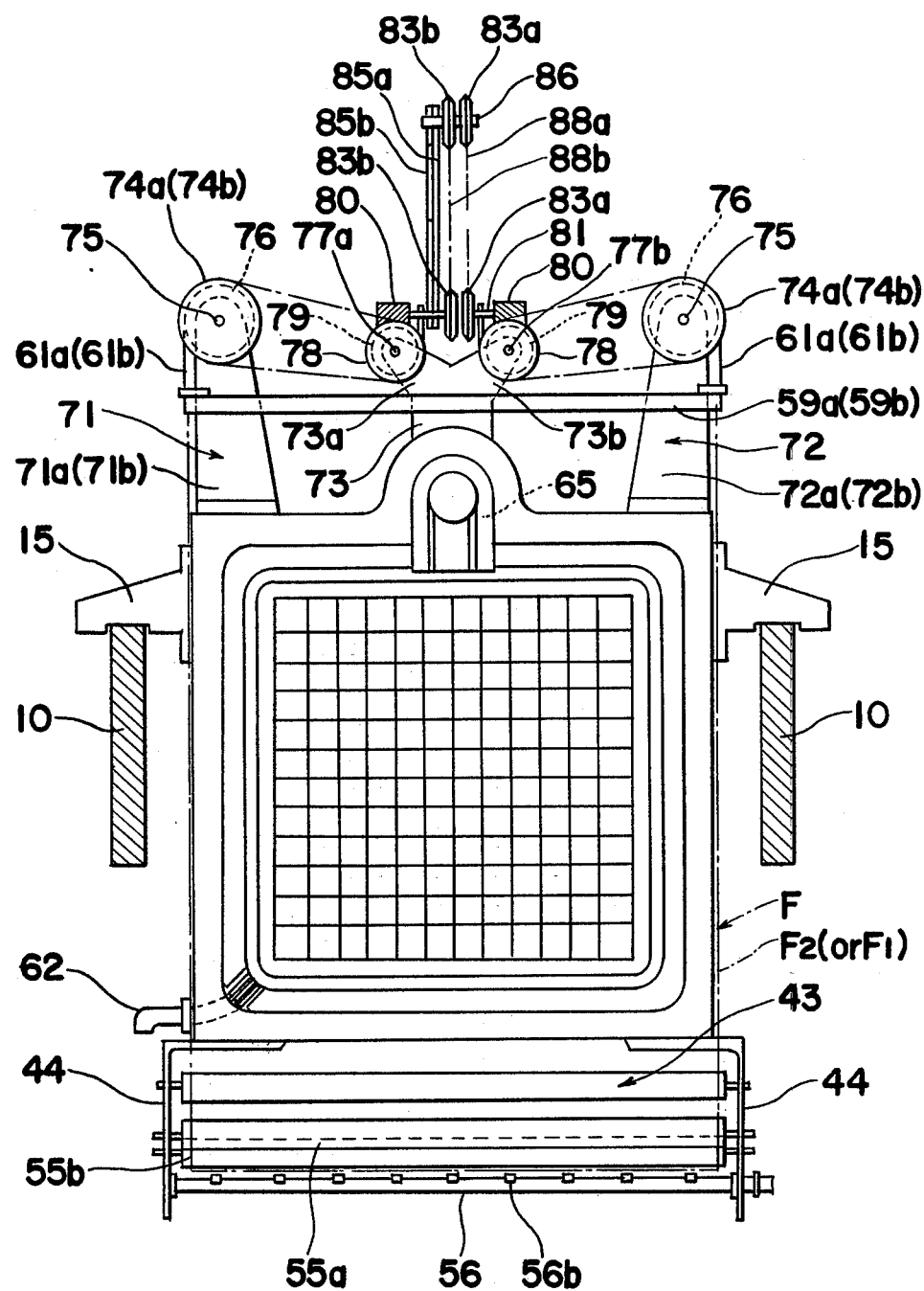
FIG. 19 is a front elevational view, showing a filter medium drive mechanism in relation to the filter plate which is employed in the filter press of the construction shown in FIG. 18.
Figure 20:
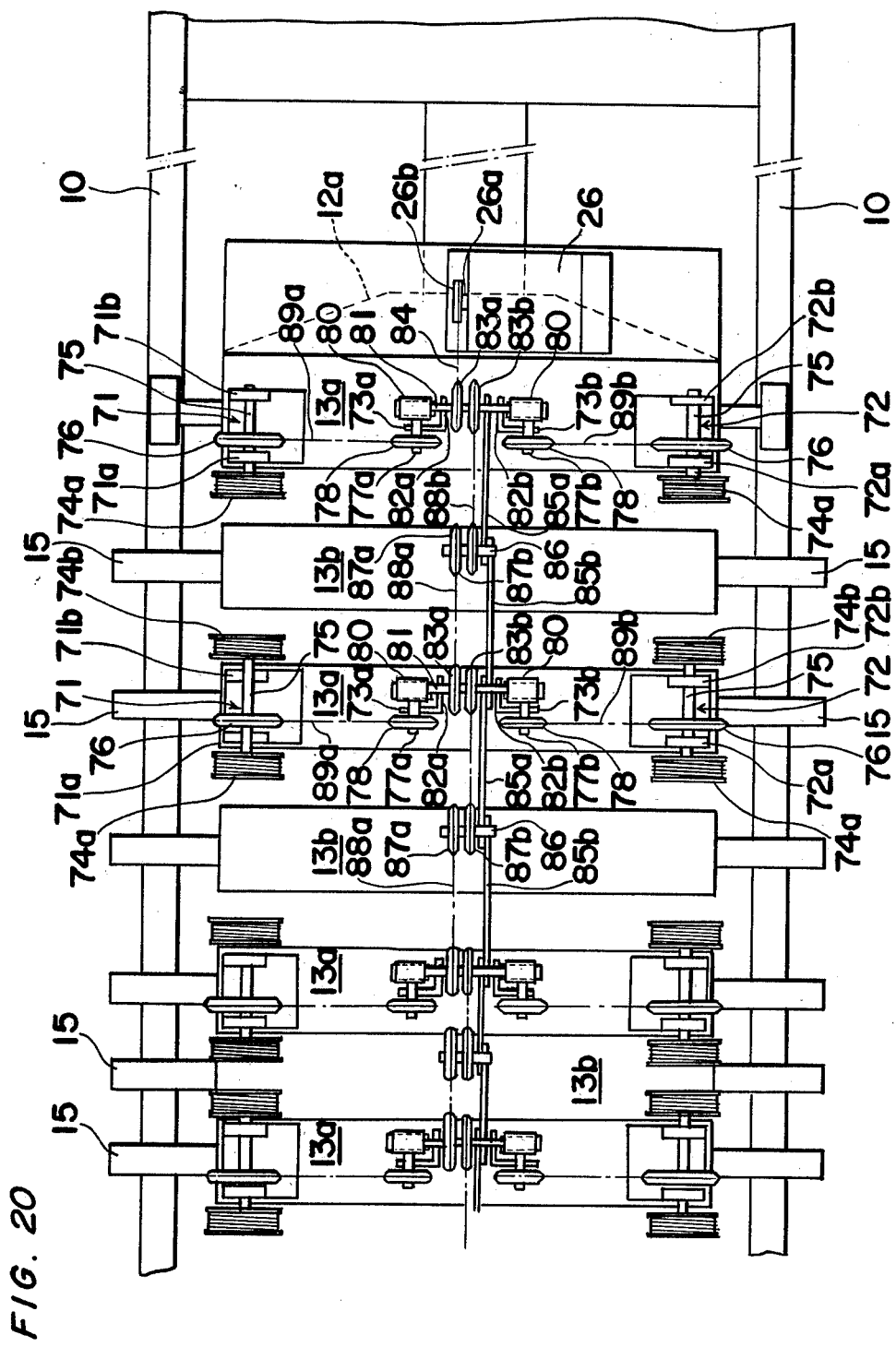
FIG. 20 is a top plan view of the filter press shown in FIG. 18.

Referring now to FIGS. 18 to 20, the filter plates are divided into two groups, one group of filters 13a and the other group of filter plates 13b being alternately arranged between the fixed and movable heads 11a and 12a in a fashion similar to the alternate arrangement of the filter plates 13 and squeeze-filter plates 14 employed in the embodiment of FIGS. 1 to 14. It is, however, to be noted that one of the filter plates 13a is shown to be an integral part of the movable head 12a. Furthermore, although not shown, the filter press shown in FIGS. 18 to 20 is to be understood as having the spacer structure composed of either telescopically extendable links or articulated links in a manner similar to that shown in FIGS. 1 to 14 or FIGS. 15 to 17, respectively.

Each of the filter plates 13a has a pair of substantially elongated side support blocks 71 and 72, each having a pair of spaced bearing arms 71a or 72a and 71b or 72b as best shown in FIG. 20, and a substantially elongated intermediate support block 73, said blocks 71, 72 and 73 being rigidly mounted on and upwardly extending from the top of the filter plate 13a. Except for the side support blocks 71 and 72 on the respective filter plates 13a adjacent the fixed and movable heads 11a and 12a, each of the side support blocks 71 and 72 carries a pair of winding pulleys 74a and 74b rigidly mounted on respective ends of a shaft 75 rotatably supported by the bearing arms 71a and 71b or 72a and 72b. The shaft 75 on each of the support blocks 71 and 72 has a sprocket wheel 76 rigidly mounted thereon and positioned between the bearing arms 71a and 71b or 72a and 72b.

It is to be noted that, as is the case with the pulleys 29 of the two groups on the respective drive shafts 23 in the embodiment of FIGS. 1 to 14, the cables 61a and 61b have their first ends connected to the respective pulleys 74a and 74b and their second ends remote from the pulleys 74a and 74b connected to the associated support bars 59a and 59b from which the filter webs $F_1$ and $F_2$ suspend as hereinbefore described.

Each of the intermediate support blocks 73 on the filter plate 13a is of a substantially Y-shaped configuration as best shown in FIG. 19 and has a pair of bearing portions 73a and 73b spaced a distance from each other in a direction substantially parallel to the filter plate 13a. Spindles 77a and 77b, each having a sprocket wheel 78 and a pinion gear 79 respectively rigidly mounted on the opposed ends of said spindle 77a or 77b, rotatably extend through the respective bearing portions 73a and 73b. Operatively engaged to the pinion gears 79 on the respective spindles 77a and 77b are worm gears 80 rigidly mounted on a transmission shaft 81 extending at right angles to any one of the spindles 77a and 77b and rotatably supported by a pair of spaced bearing lugs 82a and 82b which are respectively rigidly secured to, or otherwise integrally formed with, the bearing portions 77a and 77b of the intermediate support block 73.

A pair of sprocket wheels 83a and 83b of the same size and construction are rigidly mounted on each transmission shaft 81 for rotation together therewith and positioned between the bearing lugs 82a and 82b. While the sprocket wheel 83a on one of the filter plates 13a adjacent the movable head 12a is coupled to a sprocket wheel 26b, rigidly mounted on the drive shaft 26a of the electric reversible motor 26, by means of an endless chain 84, the sprocket wheel 83b on one filter plate 13a is operatively coupled to the sprocket wheel 83a on the next adjacent filter plate 13a in a manner as will now be described with particular reference to FIGS. 19 and 20.

The transmission shafts 81 on each two adjacent filter plates 13a are connected to each other by means of a pair of transmission links 85a and 85b having their first ends rotatably mounted on the respective transmission shafts 81 and their second ends connected to each other by an elongated spindle 86 rotatably extending through the overlapping second ends of said links 85a and 85b. Mounted on each spindle 86 for rotation together therewith are a pair of sprocket wheels 87a and 87b, which are of the same size and construction as the sprocket wheels 83a and 83b and which are respectively coupled to the sprocket wheel 83a on the filter plate 13a on one side of the filter plate 13b and the sprocket wheel 83b on the filter plate 13a on the other side of such filter plate 13b by means of endless chains 88a and 88b.

The transmission system shown in FIGS. 18 to 20 is so designed that, irrespective of the movement of the movable heads 12a and, therefore, that of the filter plates 13a and 13b of the two groups, rotation of the electric reversible motor 26 can be transmitted sequentially to the sprocket wheel 83b on the filter plate 13a adjacent the fixed head 11a from the sprocket wheel 83a on the filter plate 13a adjacent the movable head 12a, said sprocket wheel 83a on the filter plate 13a adjacent the movable head 12a being coupled to the drive sprocket wheel 26b by means of the endless chain 84.

As can readily be seen from the comparison of the left-hand portion of FIG. 18, in which some filter plates 13a and 13b are shown as compressed together with the movable head 12a positioned at the projected position, and the right-hand portion of FIG. 18 in which the other filter plates 13a and 13b are shown as separated from each other with the movable head 12a positioned at the retracted position, the transmission links 85a and 85b of each pair of pivot to assume a substantially inverted V-shape of different angle of divergence depending upon the position of the movable head 12a, with no possibility that any one of the endless chains 85a and 85b of each pair will be slackened.

For transmitting rotation of the transmission shaft 81 on each filter plate 13a of one group to the sprocket wheels 76, which are respectively supported by the side support blocks 71 and 72 in the manner as hereinbefore described, endless chains 89a and 89b are employed, one being suspended between the sprocket wheels 76 and 78 on the side of the side support block 71 and the other being suspended between the sprocket wheels 76 and 78 on the side of the side support block 72.

From the foregoing, it is clear that the filter press constructed as shown in FIGS. 18 to 20 can satisfactorily operate in a manner similar to the operation of the filter press of the construction shown in FIGS. 1 to 14 or FIGS. 15 to 17. However, it is to be noted that the filter press of the construction shown in FIGS. 18 to 20 is particularly advantageous in that the total number of the filter plates of the two groups can be increased or decreased as desired. Moreover, since any one of the drive shafts 23 such as employed in the embodiments of FIGS. 1 to 14 and FIGS. 15 to 17 is not employed, the filter press of the construction shown in FIGS. 18 to 20 can accommodate a larger number of the filter plates than the capacity of any one of the constructions shown in FIGS. 1 to 14 and FIGS. 15 to 17.

It is further to be noted that the group of the filter plates 13b may not be always necessary. Moreover, instead of the filter plates 13b, a corresponding of squeeze-filter plates may be employed.

Although the present invention has fully been described in connection with the preferred embodiments thereof with reference to the accompanying drawings, it is to be noted that various changes and modifications are apparent to those skilled in the art. By way of example, a scraper knife may be positioned adjacent each guide roll 55a or 55b for forcibly removing the residue of the cake from the filter web as is well known to those skilled in the art. Moreover, at least one row of spray nozzles for each filter web may additionally be employed for applying a washing liquid to one of the opposed surfaces of the filter web adjacent to or facing the filter plate.

Therefore, such changes and modifications are to be understood as included within the true scope of the present invention unless they depart therefrom.

What is claimed is:

1. A filter press which comprises, in combination:
   a machine framework including fixed and movable heads, said movable head being supported in position for movement between projected and retracted positions in a direction towards and away from the fixed head, respectively;
   a plurality of filter plates supported in position between the fixed and movable heads in face-to-face relation to each other, said filter plates being compressed together to a substantially watertight closure between said fixed and movable heads in response to movement of the movable head from the retracted position towards the projected position and being separated from each other when and so long as said movable head is held in the retracted position, each of said filter plates having first and second filtering surfaces opposed to each other and respectively facing towards the fixed and movable heads;

means for guiding said filter plates to permit the filter plates to be moved incident to the movement of the movable head between the retracted and projected positons;

a filter medium provided for each filter plate, said filter medium being composed of first and second webs of filter cloth adapted to respectively cover the first and second filtering surfaces of any one of the filter plates, each of said first and second filter webs being supported for movement between an operative position, in which the filter web covers the filtering surface of the corresponding filter plate, and an inoperative position in which such filter web is brought clear of such filtering surface of the corresponding filter plate;

a tensioning and winding roll assembly provided for each filter plate and carried by and positioned below the filter plate, said tensioning and winding roll assembly comprising a hollow cylindrical roll, to which the adjacent ends of the respective first and second filter webs of any pair are anchored, and means for biasing said cylindrical roll in one direction about the longitudinal axis of said cylindrical roll with the first and second filter webs of the corresponding pair forced to be wound up around said cylindrical roll;

a support bar positioned between each adjacent two of the filter plates and to which the other end of any one of the first and second filter webs of one pair and the other end of the other of the first and second filter webs of the next adjacent pair are anchored;

a pair of winding elements provided for each filter plate and positioned on respective sides of and above each adjacent two of the filter plates;

a pair of elongated connecting members provided for each pair of the winding elements, said connecting members of each pair being connected at their one end to the opposite ends of the corresponding support bar and at their other end to the corresponding winding elements;

means operable when said movable head is in the retracted position for driving said winding elements of any pair to bring said first and second filter webs of the corresponding pair to the operative position against the biasing means of the associated tensioning and winding roll assembly and to allow the first and second filter webs of said any pair to be drawn onto the associated tensioning and winding roll assembly by the action of the biasing means, selectively; and a pair of juxtaposed guide rolls carried by each filter plate and positioned below the tensioning and winding roll assembly, said first and second filter webs of the pair, which extend from the associated support bars towards the tensioning and winding roll assembly, being turned respectively around said guide rolls to assume a substantially U-shaped configuration.

2. A filter press as claimed in claim 1, wherein said driving means includes an electric reversible motor, a pair of drive shafts extending in parallel relation to each other above the filter plates in a direction parallel to the direction of the movement of the movable head and operatively coupled to said reversible motor, and a transmission means for transmitting rotation of said motor to said drive shafts, and wherein said winding elements are constituted by respective winding pulleys mounted on the drive shafts for rotation together therewith.

3. A filter press as claimed in claim 2, wherein said winding pulleys are mounted on the respective drive shafts also for axial sliding movement.

4. A filter press as claimed in claim 2, wherein each of said winding pulleys of any pair has an axial projection in alignment with the longitudinal axis of the corresponding drive shaft, and further comprising a sleeve having one end portion, rotatably mounted on the axial projection of any one of the winding pulleys of the pair, and the other end portion rotatably mounted on the axial projection of one of the winding pulleys of the next adjacent pair which is positioned adjacent said axial projection of said any one of the winding pulleys of such pair, any one of said filter plates being pivotally connected to said sleeve.

5. A filter press as claimed in claim 4, wherein said filter plate is pivotally connected to said sleeve by means of a height adjusting mechanism.

6. A filter press as claimed in claim 1, wherein said driving means includes an electric reversible motor carried by the movable head, a pair of sprocket wheels rotatably carried by and mounted on each filter plate, one of said sprocket wheels of the pair on one of the filter plates adjacent the movable head being operatively coupled to said reversible motor, articulated transmission means connecting any one of the sprocket wheels of each pair to the other of the sprocket wheels of the next succeeding pair for transmitting rotation of said motor sequentially to the sprocket wheels on the filter plates, and means for transmitting rotation of the sprocket wheels of any pair to the associated winding elements.

* * * * *